(12) United States Patent
Kanaoka et al.

(10) Patent No.: US 12,097,618 B2
(45) Date of Patent: Sep. 24, 2024

(54) DRIVE UNIT ADOPTING ADMITTANCE CONTROL

(71) Applicant: Man-Machine Synergy Effectors, Inc., Shiga (JP)

(72) Inventors: Katsuya Kanaoka, Shiga (JP); Ryo Kikuuwe, Shiga (JP)

(73) Assignee: Man-Machine Synergy Effectors, Inc., Shiga (JP)

( * ) Notice: Subject to any disclaimer, the term of this patent is extended or adjusted under 35 U.S.C. 154(b) by 314 days.

(21) Appl. No.: 17/759,677

(22) PCT Filed: Jan. 29, 2021

(86) PCT No.: PCT/JP2021/003271
§ 371 (c)(1),
(2) Date: Jul. 28, 2022

(87) PCT Pub. No.: WO2021/153741
PCT Pub. Date: Aug. 5, 2021

(65) Prior Publication Data
US 2023/0081478 A1 Mar. 16, 2023

(30) Foreign Application Priority Data

Jan. 29, 2020 (JP) .................................. 2020-012828

(51) Int. Cl.
*H02P 23/14* (2006.01)
*B25J 9/16* (2006.01)
(52) U.S. Cl.
CPC ... *B25J 9/1633* (2013.01); *G05B 2219/39261* (2013.01); *G05B 2219/39322* (2013.01); *G05B 2219/39339* (2013.01)
(58) Field of Classification Search
CPC ......... B25J 9/1633; G05B 2219/39261; G05B 2219/39322; G05B 2219/39339
See application file for complete search history.

(56) References Cited

U.S. PATENT DOCUMENTS

| 2018/0029228 | A1* | 2/2018 | Haddadin | ............. | B25J 9/1633 |
| 2018/0207798 | A1* | 7/2018 | Tsuzaki | ................. | B25J 13/085 |
| 2021/0138639 | A1* | 5/2021 | De Lange | ............. | B25J 9/1633 |

FOREIGN PATENT DOCUMENTS

| EP | 3654119 A1 | 5/2020 |
| JP | 2007-102748 A | 4/2007 |

(Continued)

OTHER PUBLICATIONS

Suzumori, K., Backdrivability of Robots and Actuators, Journal of the Robotics Society of Japan, Jul. 2013, vol. 31, No. 6, pp. 548-551.

*Primary Examiner* — Muhammad S Islam
(74) *Attorney, Agent, or Firm* — Hodgson Russ LLP (57) ABSTRACT

A drive unit 10A is configured to exert a driving force on an environment 50 in accordance with a target driving force command $\tau_d$, and includes a parameter storage device 30A, a force measuring instrument 35, an admittance model calculation device 31A, and a position control and driving device 33A. The parameter storage device 30A has stored therein dynamics parameters of first and second virtual objects affected by a virtual interactive force $\lambda_R$. The force measuring instrument 35 is configured to output a measurement result for the driving force as a measured driving force value $\tau_s$. The admittance model calculation device 31A is configured to calculate and output a displacement of the first virtual object. The displacement is obtained by calculations based on the stored dynamics parameters, the target driving force command $\tau_d$, and the measured driving force value $\tau_s$. The position control and driving device 33A is configured to operate in accordance with a target position command. The force measuring instrument 35 is disposed between the position control and driving device 33A and the environment 50. The target position command corresponds to the first virtual object's displacement outputted by the admittance (Continued)

model calculation device 31A. The drive unit 10A achieves advantages of both high and low backdrivability.

14 Claims, 10 Drawing Sheets

(56) References Cited

FOREIGN PATENT DOCUMENTS

| JP | 6032811 B2 | 11/2016 |
| JP | 2019-020826 A | 2/2019 |
| WO | 2019/013067 A1 | 1/2019 |

* cited by examiner

DRIVE UNIT ADOPTING ADMITTANCE CONTROL

TECHNICAL FIELD

The present invention relates to a drive unit employing admittance control and thereby allowing force control by a position/velocity control and driving device.

BACKGROUND ART

Conventionally, various control methods are used to control forces generated by driving devices (e.g., actuators or robots consisting of integrated sets of actuators). For example, it is often the case that a control method called admittance control is used when the position or velocity of a driving device is controlled and the driving force that the driving device exerts on an environment can be measured by a force measuring instrument.

Figure 10:
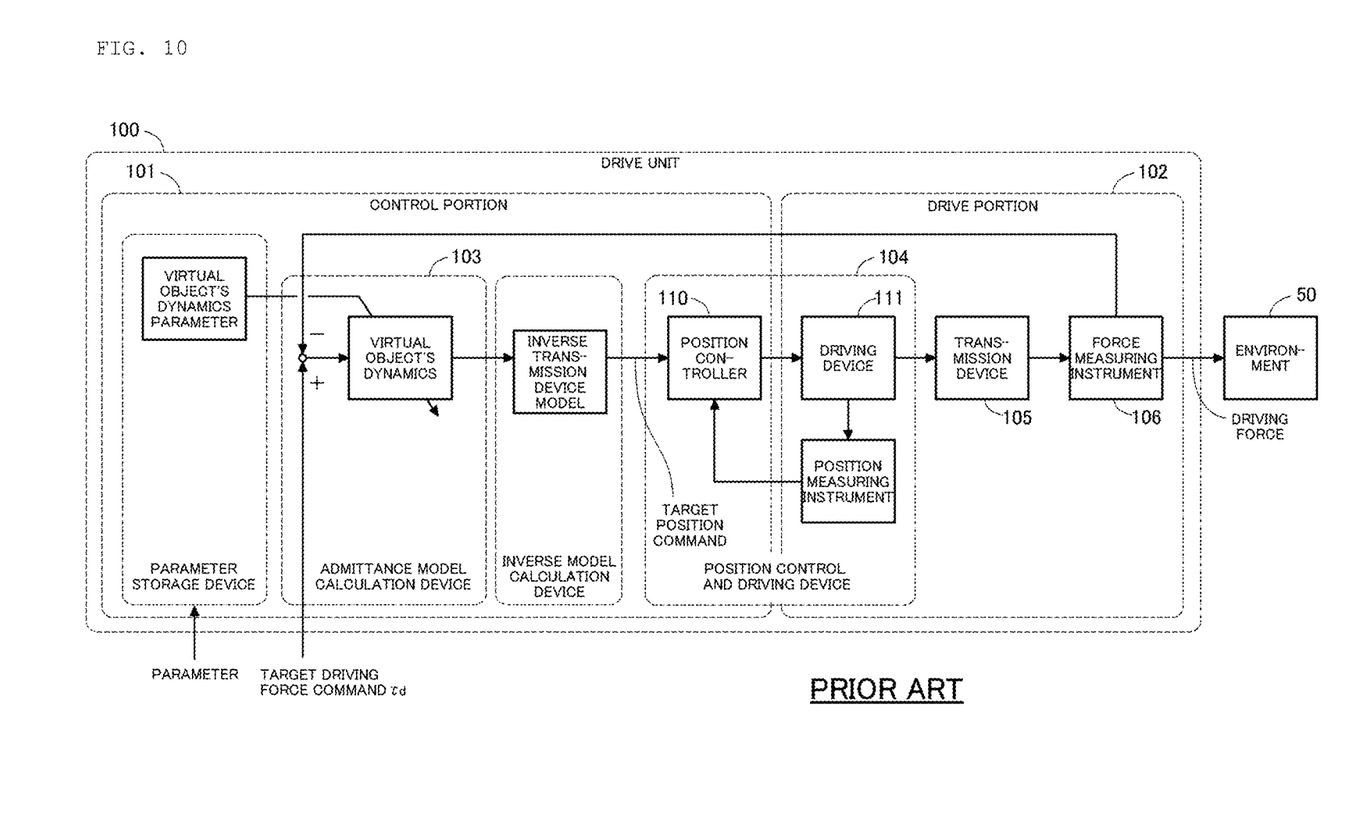
FIG. 10 is a block diagram of a conventional drive unit.

FIG. 10 illustrates a typical admittance-controlled drive unit 100. In general, admittance control uses a virtual object having ideal dynamics. The motion of such a virtual object is simulated by an admittance model calculation device 103 (a forward kinematic simulator) on the basis of driving force information obtained by a force measuring instrument 106. In this case, a position controller 110 controls the position of a driving device 111 such that the driving device 111 follows the simulated motion of the virtual object. When the position control is sufficiently accurate, the driving device 111 reacts to an external force from an environment 50, with approximately the same ideal dynamics of the virtual object. Accordingly, admittance control allows a position control and driving device 104 to realize force control in accordance with such ideal dynamics.

It should be noted that, for example, Patent Document 1 describes that admittance control uses a virtual object.

Incidentally, it is known that when the driving device 111 is a regular rotary motor coupled at an output end to a transmission device 105, which is a reduction gear, backdrivability is reduced due to relatively high inertia and friction inherent in the transmission device 105 (higher than those inherent in the driving device 111; see, for example, Non-Patent Document 1). When there is a reduction in backdrivability, it is difficult for the driving device 111 to smoothly or flexibly respond to external forces from the environment 50.

In this regard, even when the backdrivability of the transmission device 105 is low, high backdrivability can still be realized while achieving low inertia and friction, to deal with external forces from the environment 50, so long as the force measuring instrument 106 is provided on a terminal output shaft, i.e., an output shaft of the transmission device 105, and admittance control as described above is applied to allow the virtual object to have dynamics characterized by low inertia and friction. Realizing high backdrivability increases the safety of the driving device 111 and allows the driving device 111 to smoothly adapt to the environment 50.

PRIOR ART DOCUMENTS

Patent Document

Patent Document 1: Japanese Patent No. 6032811

Non-Patent Document

Non-Patent Document 1: Suzumori, Koichi. "Backdrivability of robots and actuators." Journal of the Robotics Society of Japan, July 2013, Vol. 31, No. 6, PP. 548-551.

DISCLOSURE OF THE INVENTION

Problems to be Solved by the Invention

However, if the inertia of the virtual object is excessively lowered to realize high backdrivability, the acceleration of the virtual object might become excessively high for the driving force, resulting in unstable position control in the position control and driving device 104.

Furthermore, low backdrivability might be desirable depending on the use of the drive unit 100. For example, in the case where the transmission device 105 included in a drive portion 102 is a reduction gear with a high reduction ratio, the drive portion 102 has a relatively high apparent mechanism inertia (i.e., the actual inertia of the drive portion 102 is relatively high), and therefore setting the inertia of the virtual object so as to match the mechanism inertia results in a lower load on the driving device 111 and more stable position control.

Furthermore, introducing better friction (e.g., linear viscous friction and/or ideal Coulomb friction) rather than simply lowering the friction of the virtual object realizes the following functions: (1) the driving device 111 stays still without becoming unsteady when the driving device 111 needs to be still; and (2) the driving device 111 moves smoothly and lightly without excessively speeding up when the driving device 111 should move.

As described above, both high and low backdrivability have respective advantages. However, in the case of conventional admittance control, which simply uses a single virtual object, it is difficult to achieve the advantages of both high and low backdrivability.

The present invention has been achieved under the above circumstances, with a problem thereof being to provide a drive unit that achieves advantages of both high and low backdrivability.

Solution to the Problems

To solve the above problem, a first drive unit according to the present invention is configured to exert a driving force on an environment in accordance with an externally provided target driving force command, and includes a parameter storage device having stored therein dynamics parameters of first and second virtual objects affected by a virtual interactive force, a force measuring instrument configured to output a measurement result for the driving force as a measured driving force value, an admittance model calculation device configured to calculate and output a displacement of the first virtual object, the displacement being obtained by calculations based on the first and second virtual objects' dynamics parameters stored in the parameter storage device, the target driving force command, and the measured driving force value, and a position control and driving device configured to operate in accordance with a target position command and thereby exert the driving force on the environment, wherein the force measuring instrument is disposed between the position control and driving device and the environment, and the target position command corresponds to the first virtual object's displacement outputted by the admittance model calculation device.

The position control and driving device of the first drive unit is, for example, a single-axis device configured to operate in accordance with the target position command.

Furthermore, to solve the above problem, a second drive unit according to the present invention is configured to exert a driving force on an environment in accordance with an externally provided target driving force command, and includes a parameter storage device having stored therein dynamics parameters of first and second virtual objects affected by a virtual interactive force, a force measuring instrument configured to output a measurement result for the driving force as a measured driving force value, an admittance model calculation device configured to calculate and output a velocity of the first virtual object, the velocity being obtained by calculations based on the first and second virtual objects' dynamics parameters stored in the parameter storage device, the target driving force command, and the measured driving force value, and a velocity control and driving device configured to operate in accordance with a target velocity command and thereby exert the driving force on the environment, wherein the force measuring instrument is disposed between the velocity control and driving device and the environment, and the target velocity command corresponds to the first virtual object's velocity outputted by the admittance model calculation device.

The velocity control and driving device of the second drive unit is, for example, a single-axis device configured to operate in accordance with the target position command.

It is preferred that in each of the first and second drive units, the first and second virtual objects' dynamics parameters stored in the parameter storage device be externally modifiable.

The first and second drive units may be configured such that the measured driving force value directly acts only on the first virtual object's dynamics in the calculations by the admittance model calculation device, the target driving force command directly acts only on the second virtual object's dynamics in the calculations by the admittance model calculation device, and the first and second virtual objects' dynamics interact with each other solely via the virtual interactive force outputted by a virtual interactive force model.

In each of the first and second drive units, the parameter storage device may further store interaction parameters for the virtual interactive force model (including upper and lower limit values of the virtual interactive force).

In each of the first and second drive units, the virtual interactive force model may have a function that converges a relative displacement or velocity between the first and second virtual objects to zero, and in this case, the parameter storage device may further store interaction parameters for the virtual interactive force model (including a parameter for the convergence).

It is preferred that in each of the first and second drive units, the virtual interactive force model's interaction parameters stored in the parameter storage device are externally modifiable.

Effect of the Invention

The present invention renders it possible to provide a drive unit that achieves advantages of both high and low backdrivability.

MODES FOR CARRYING OUT THE INVENTION

Hereinafter, some embodiments of a drive unit according to the present invention will be described with reference to the accompanying drawings.

First Embodiment

Figure 1:
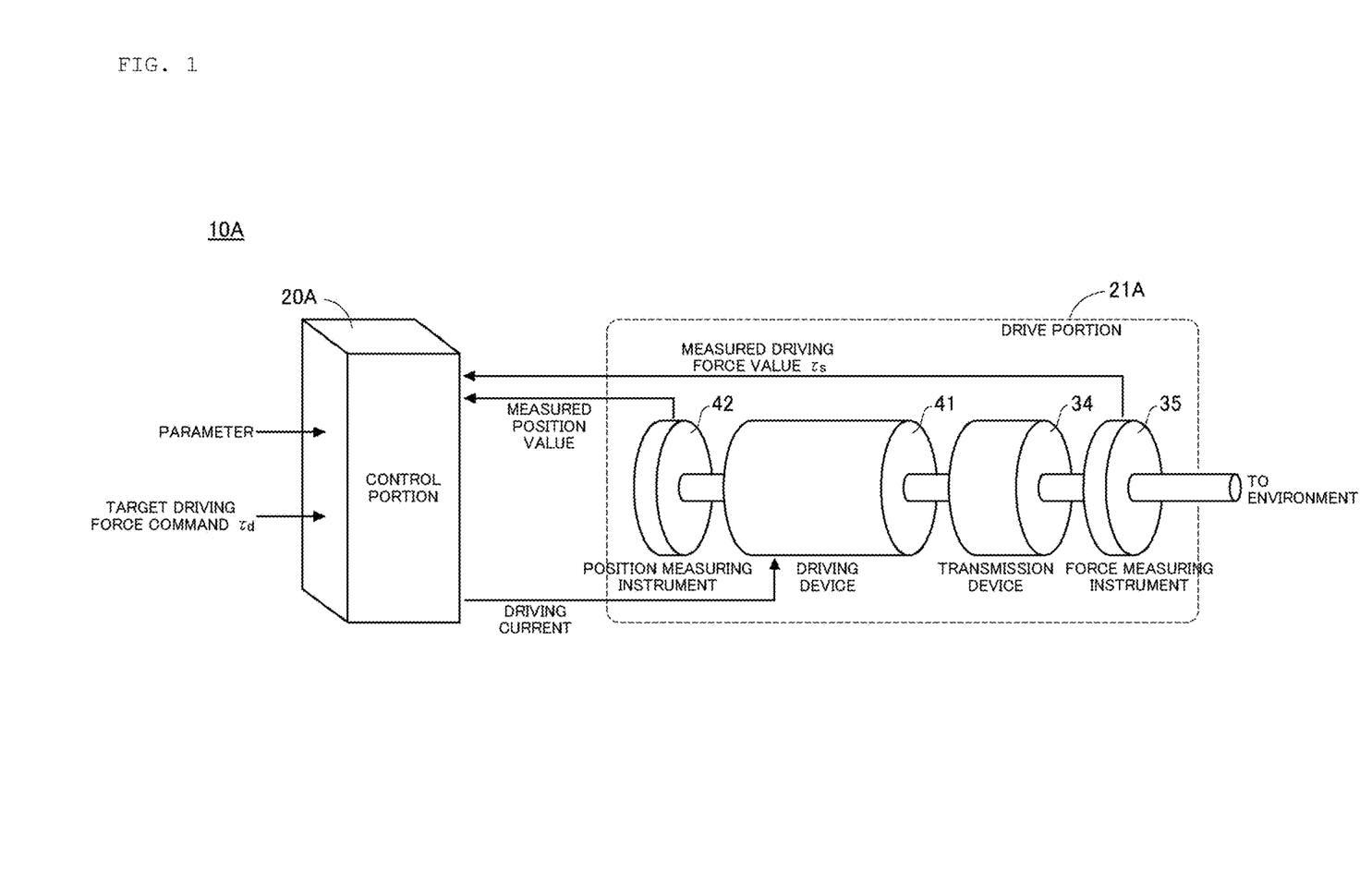
FIG. 1 is a schematic entity-relationship diagram of a drive unit according to a first embodiment of the present invention.

FIG. 1 shows a schematic entity-relationship diagram of a drive unit 10A according to a first embodiment of the present invention. The drive unit 10A according to the present embodiment is configured to exert a driving force on an environment in accordance with an externally provided target driving force command $\tau_d$, and includes a control portion 20A and a drive portion 21A.

The control portion 20A includes a microprocessor and accompanying volatile/non-volatile memory.

The drive portion 21A includes a driving device 41, which is a single-axis rotary motor, a position measuring instrument 42 configured to measure a displacement of the driving device 41 and output the measurement result as a measured position value, a transmission device 34, which is a reduction gear provided on an output shaft of the driving device 41, and a force measuring instrument 35, which is a torque sensor provided on a terminal end portion (terminal output shaft) of the transmission device 34. The force measuring instrument 35 is configured to measure the driving force that the drive unit 10A exerts on the environment, and output the measurement result as a measured driving force value $\tau_s$. The position of the driving device 41 is controlled in accordance with a driving current provided by the control portion 20A.

It should be noted that the driving device 41 may be any actuator or multi-axis robot. The transmission device 34 may be any power train (including a clutch, a transmission, a driveshaft, and a linkage) configured to transmit an internal driving force of the driving device 41 to the environment after converting the driving force into a suitable form. Moreover, in the case where the driving device 41 is of a translational type, the force measuring instrument 35 is preferably a force sensor.

Figure 2:
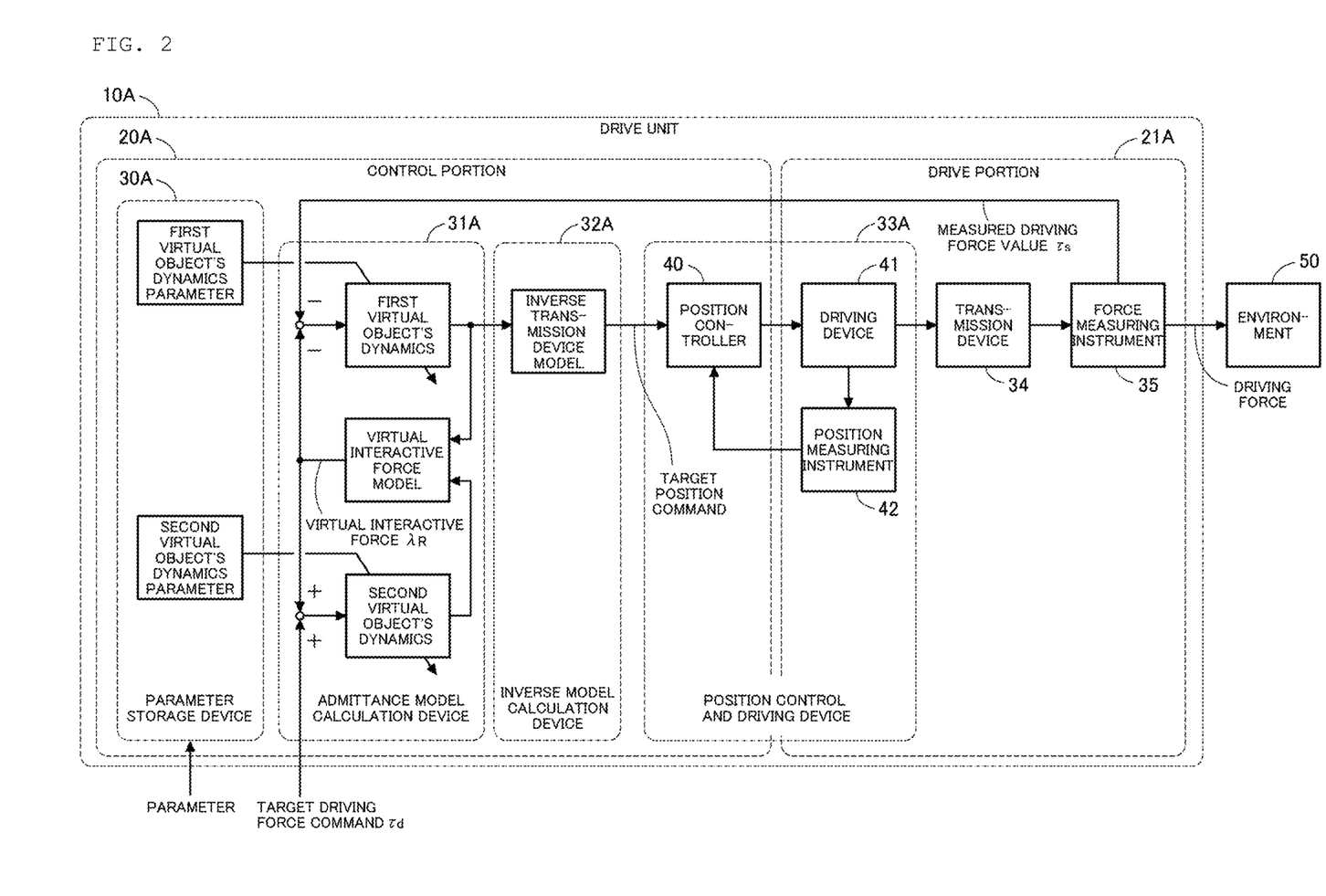
FIG. 2 is a block diagram of the drive unit according to the first embodiment of the present invention.

FIG. 2 shows a block diagram of the drive unit 10A according to the present embodiment. As shown in the figure, the control portion 20A of the drive unit 10A includes a parameter storage device 30A, an admittance model calculation device 31A, an inverse model calculation device 32A, and a position controller 40, which along with the driving device 41 and the position measuring instrument 42, constitutes a position control and driving device 33A. The position control and driving device 33A operates in accordance with a target position command.

The admittance model calculation device 31A is configured to perform time integration of simultaneous differential equations (1) to (3) and thereby simulate the motion of first and second virtual objects in accordance with the target driving force command $\tau_d$ and the measured driving force value $\tau_s$.

First Virtual Object's Dynamics $$\kappa M p''_1 + \gamma D p'_1 = -\tau_s - \lambda_R \quad (1)$$

Second Virtual Object's Dynamics $$(1-\kappa)M p''_2 + (1-\gamma)D' p_2 = \tau_d + \lambda_R \quad (2)$$

Virtual Interactive Force Model $$\lambda_R = \lambda_R(p''_1, p'_1, p_1, p''_2, p'_2, p_2) \quad (3)$$

where

M and κ are total virtual object inertia and an inertia distribution ratio (0<κ<1), D and γ are total virtual object viscous friction and a viscous friction distribution ratio (0<γ<1), $p_1$, $p'_1$, and $p''_1$ are the first virtual object's displacement, velocity, and acceleration, $p_2$, $p'_2$, and $p''_2$ are the second virtual object's displacement, velocity, and acceleration, and $\lambda_R$ is a virtual interactive force.

From the viewpoint of ensuring control stability and reducing the load on the mechanism of the drive portion 21A, the total virtual object inertia M is preferably set so as to match the actual total inertia of the mechanism. However, as in the case of model-based control, there is no need to take account of modeling errors, and if any modeling error occurs, there might be no problem so long as control stability is ensured.

On the other hand, the total virtual object viscous friction D does not have to match the actual total viscous friction of the mechanism of the drive portion 21A. However, viscous friction affects the ensuring of control stability and the improvement of positioning performance, and therefore needs to be properly set in view of overall balance.

The setting of the inertia distribution ratio κ and the viscous friction distribution ratio γ will be described later.

The parameter storage device 30A has the total virtual object inertia M, the inertia distribution ratio κ, the total virtual object viscous friction D, and the viscous friction distribution ratio γ stored as the first and second virtual objects' dynamics parameters. In the present embodiment, these parameters can be externally modified at any time.

It should be noted that instead of storing the parameters M, κ, D, and γ, the parameter storage device 30A may have first virtual object inertia $M_1$ (=κM) and first virtual object viscous friction $D_1$ (=γD) stored as the first virtual object's dynamics parameters and second virtual object inertia $M_2$ (=(1−κ)M) and second virtual object viscous friction $D_2$ (=(1−γ)D) stored as the second virtual object's dynamics parameters. It is preferred that these parameters can also be externally modified at any time.

Figure 3:
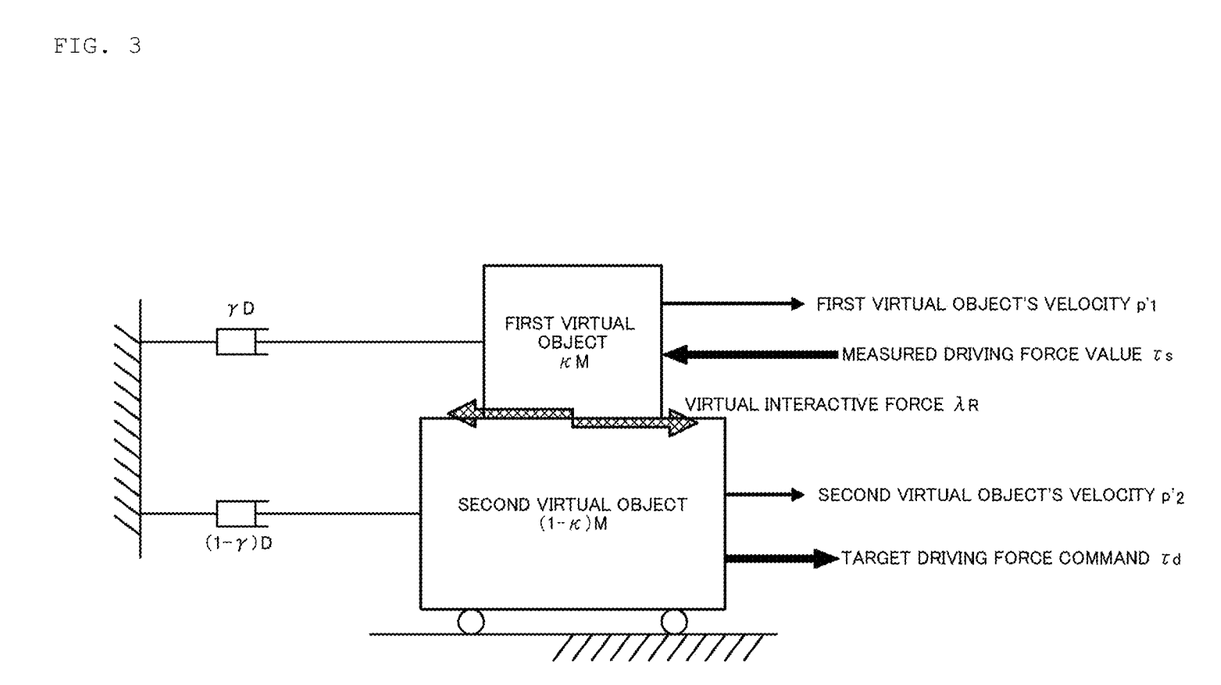
FIG. 3 is a diagram showing the relationship between first and second virtual objects in the present invention.

FIG. 3 shows the relationship between the first and second virtual objects. As is apparent from the figure, the first and second virtual objects' dynamics are treated separately in calculations performed by the admittance model calculation device 31A, and the first and second virtual objects interact with each other solely via the virtual interactive force $\lambda_R$ outputted by the virtual interactive force model. Moreover, in the calculations performed by the admittance model calculation device 31A, the target driving force command $\tau_d$ directly acts only on the second virtual object's dynamics, and the measured driving force value $\tau_s$ directly acts only on the first virtual object's dynamics.

Referring back to FIG. 2, the inverse model calculation device 32A is configured to perform an inverse calculation and thereby convert the first virtual object's displacement $p_1$ (specifically, the displacement at a terminal end of the drive unit 10A) calculated by the admittance model calculation device 31A into a target position command $q_d$ for the position control and driving device 33A.

More specifically, in the present embodiment in which the transmission device 34 is a reduction gear, the displacement p at the terminal end of the drive unit 10A and a displacement q of the position control and driving device 33A have a geometric relationship as given by equation (4), where $n_r$ is a reduction ratio of the reduction gear, and therefore the target position command $q_d$ for the position control and driving device 33A can be obtained using an inverse transmission device model as given by equation (5).

$$p = p(q) = \frac{q}{n_r} \quad (4)$$

$$q_d = p^{-1}(p_1) = n_r p_1 \quad (5)$$

In other words, in the case where there is a geometric relationship (kinematics) as given by equation (6) between an input and an output of the transmission device 34, the inverse model calculation device 32A performs an inverse calculation (inverse kinematics) as given by equation (7).

$$p=p(q) \quad (6)$$

$$q=p^{-1}(p) \quad (7)$$

The position controller 40, which constitutes a part of the position control and driving device 33A, is configured to control the position of the driving device 41 in accordance with the target position command. At the time of the position control, the position controller 40 references the measured position value outputted by the position measuring instrument 42.

In this manner, in the case of the drive unit 10A according to the present embodiment, the motion of the two virtual objects (i.e., the first and second virtual objects) linked only by the virtual interactive force $\lambda_R$ is simulated on the basis of driving force information (measured driving force value $\tau_s$) obtained by the force measuring instrument 35, and the position of the driving device 41 is controlled such that the driving device 41 follows the motion of the first virtual object. Therefore, properly setting the distribution ratios κ and γ allows the drive unit 10A to achieve advantages of both high and low backdrivability.

Second Embodiment

Figure 4:
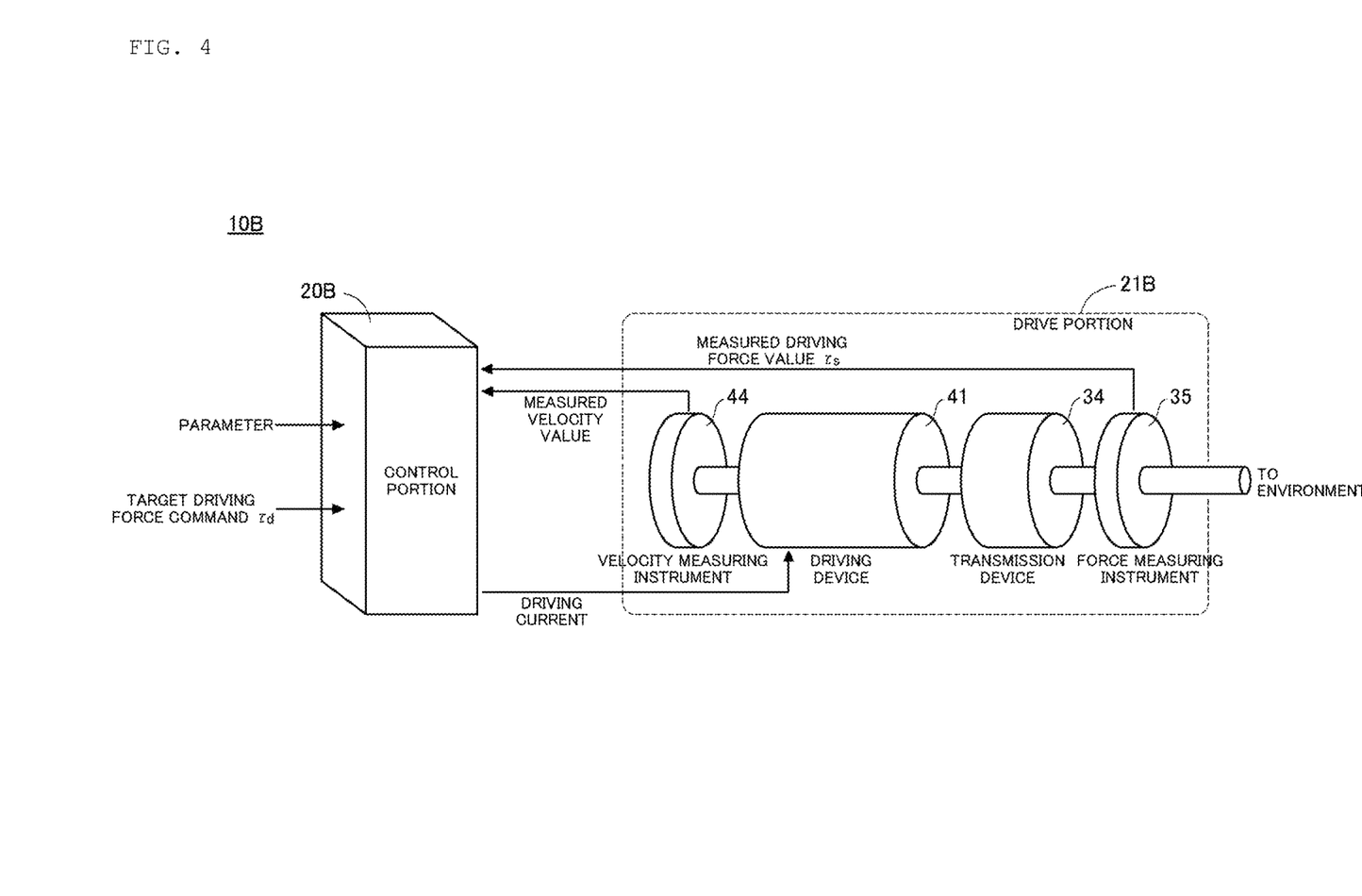
FIG. 4 is a schematic entity-relationship diagram of a drive unit according to a second embodiment of the present invention.
Figure 5:
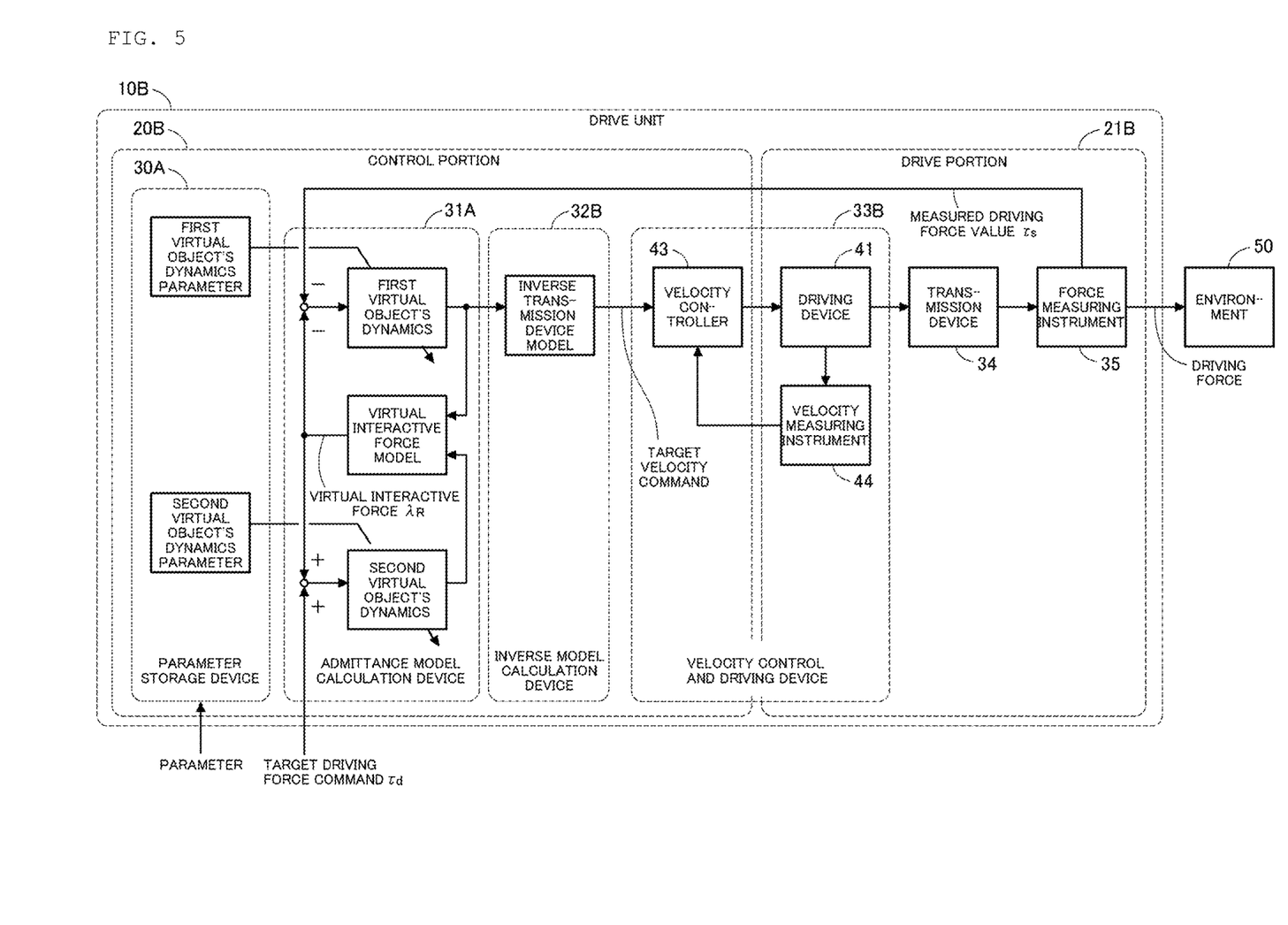
FIG. 5 is a block diagram of the drive unit according to the second embodiment of the present invention.

FIGS. 4 and 5 illustrate a drive unit 10B according to a second embodiment of the present invention. The drive unit 10B according to the present embodiment differs from the drive unit 10A in that the drive unit 10B includes a control portion 20B and a drive portion 21B in place of the control portion 20A and the drive portion 21A.

The control portion 20B has the same configuration as the control portion 20A except that the control portion 20B includes an inverse model calculation device 32B and a velocity controller 43 in place of the inverse model calculation device 32A and the position controller 40.

The drive portion 21B has the same configuration as the drive portion 21A except that the drive portion 21B includes a velocity measuring instrument 44 in place of the position measuring instrument 42.

The inverse model calculation device 32B is configured to perform an inverse calculation and thereby convert the first virtual object's velocity p'$_1$ calculated by the admittance model calculation device 31A into a target velocity command for a velocity control and driving device 33B.

The velocity controller 43, which constitutes a part of the velocity control and driving device 33B, is configured to control the velocity of the driving device 41 in accordance with the target velocity command. At the time of the velocity control, the velocity controller 43 references a velocity (measured velocity value) of the driving device 41 as obtained by the velocity measuring instrument 44.

Properly setting the distribution ratios κ and γ allows the drive unit 10B according to the present embodiment to achieve advantages of both high and low backdrivability, as done in the first embodiment.

Third Embodiment

Figure 6:
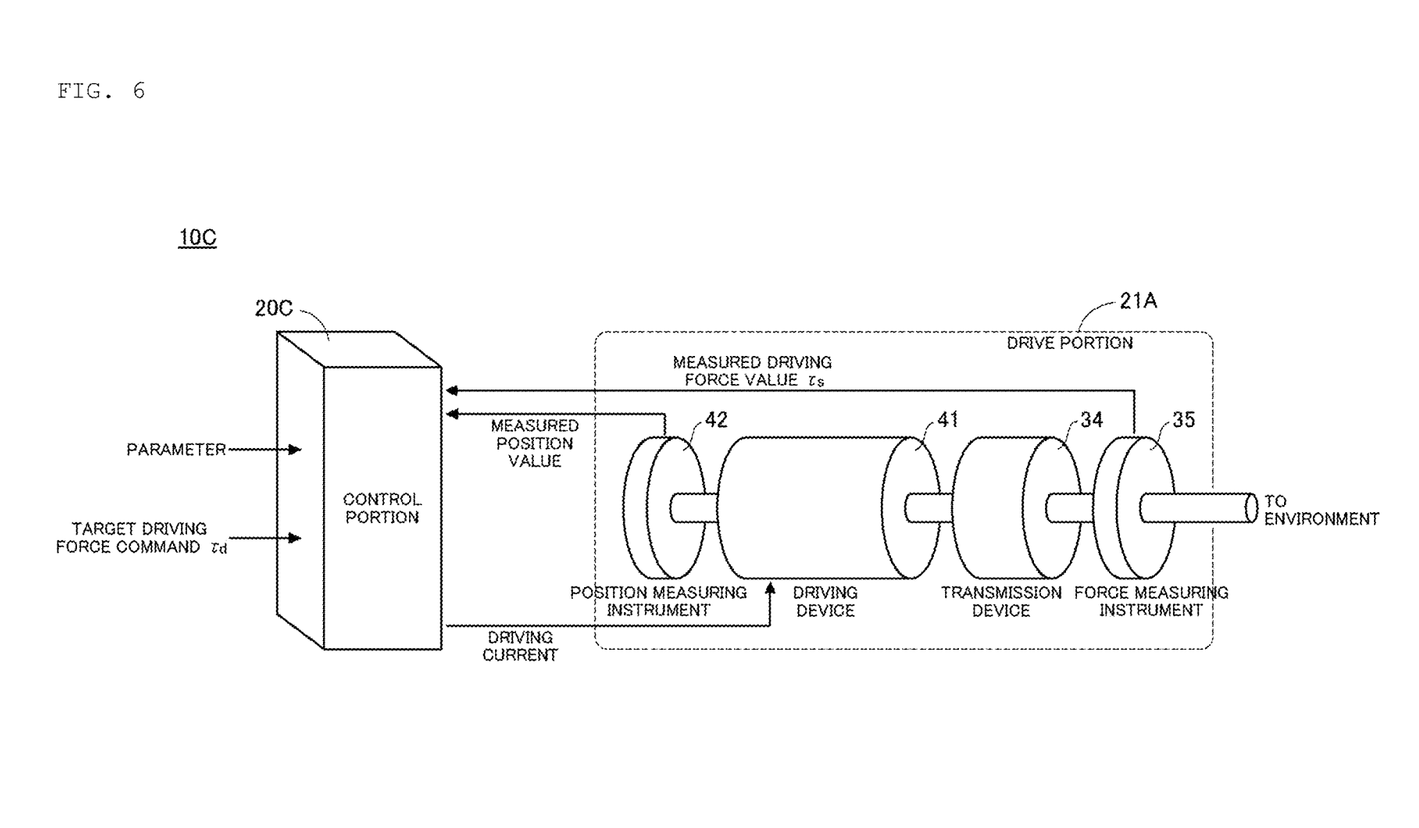
FIG. 6 is a schematic entity-relationship diagram of a drive unit according to a third embodiment of the present invention.
Figure 7:
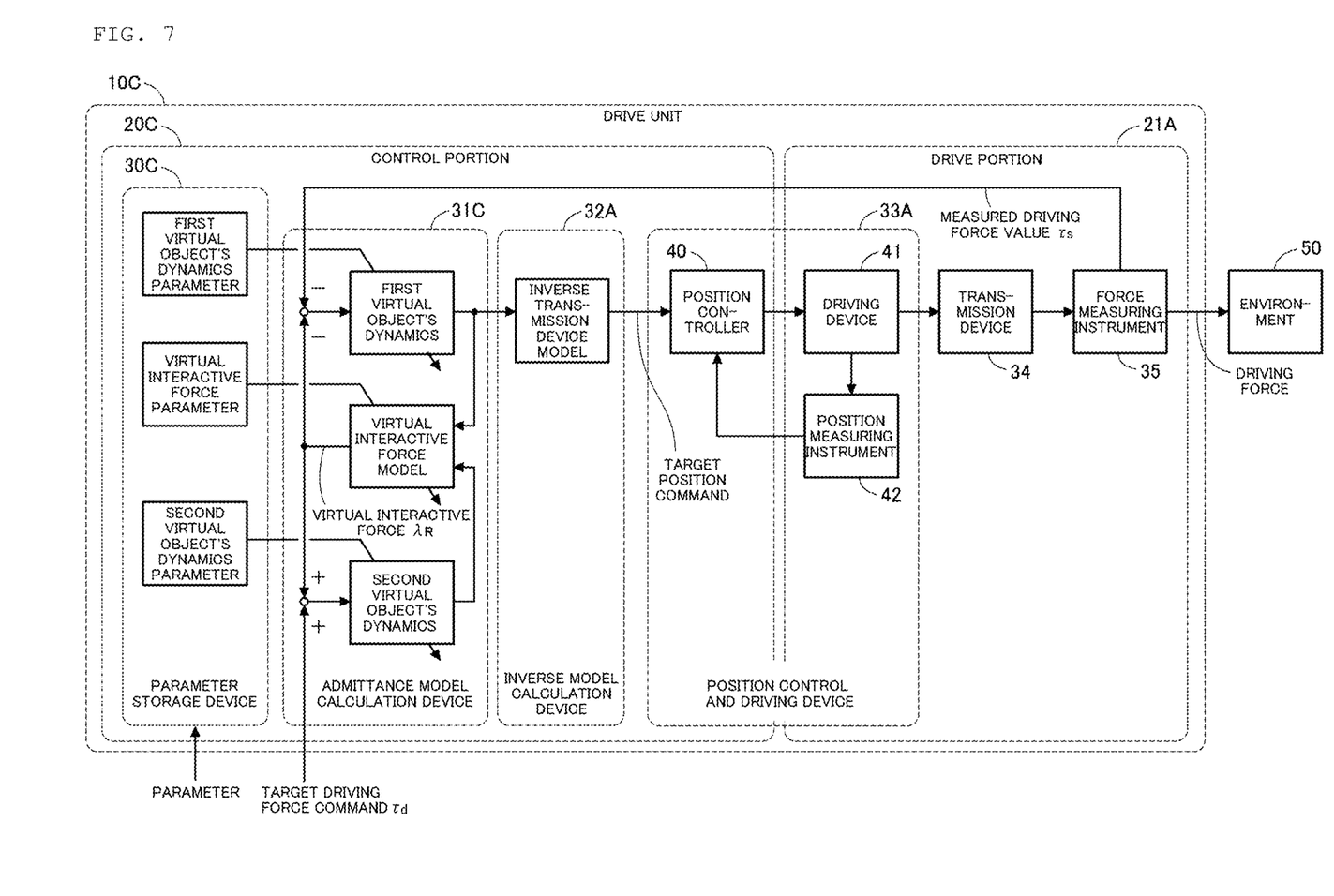
FIG. 7 is a block diagram of the drive unit according to the third embodiment of the present invention.

FIGS. 6 and 7 illustrate a drive unit 10C according to a third embodiment of the present invention. The drive unit 10C according to the present embodiment differs from the drive unit 10A in that the drive unit 10C includes a control portion 20C in place of the control portion 20A, but the drive unit 10C includes the same drive portion as the drive portion 21A included in the drive unit 10A.

The control portion 20C has the same configuration as the control portion 20A except that the control portion 20C includes a parameter storage device 30C and an admittance model calculation device 31C in place of the parameter storage device 30A and the admittance model calculation device 31A.

The admittance model calculation device 31C is configured to perform time integration of a system of simultaneous differential equations consisting of (1) and (2) above and (8) and (9) below and thereby simulate the motion of the first and second virtual objects in accordance with the target driving force command $\tau_d$ and the measured driving force value $\tau_s$.

Virtual Interactive Force Model $$\lambda_R = \begin{cases} R_{upper} & (R_{upper} < \lambda_{RPD}) \\ \lambda_{RPD} & (R_{lower} \le \lambda_{RPD} \le R_{upper}) \\ R_{lower} & (\lambda_{RPD} < R_{lower}) \end{cases} \quad (8)$$

$$\lambda_{RPD} = \lambda_{RPD}(p'_1, p'_2, p_1, p_2) = K_{RP}(p_2 - p_1) + K_{RD}(p'_2 - p'_1) \quad (9)$$

where $R_{upper}$ is an upper limit value of the virtual interactive force, $R_{lower}$ is a lower limit value of the virtual interactive force, and $K_{RP}$ and $K_{RD}$ are gains for the virtual interactive force model.

The parameter storage device 30C has stored therein virtual interactive force parameters in addition to the first and second virtual objects' dynamics parameters, and the virtual interactive force parameters include the upper and lower limit values $R_{upper}$ and $R_{lower}$ of the virtual interactive force and the gains $K_{RP}$ and $K_{RD}$ for the virtual interactive force model. It is preferred that these parameters can also be externally modified at any time.

For the drive unit 10C according to the present embodiment, the virtual interactive force model includes two additional functions to be described below.

Described first is a "virtual torque limiter function".

In the case where an external force from the environment 50 is greater than or equal to $R_{lower}$ but less than or equal to $R_{upper}$, the virtual interactive force $\lambda_R$ is equal to $\lambda_{RPD}$ as given by equation (9). In this case, the first and second virtual objects can be regarded as moving as one in response to the external force. On the other hand, when the external force is greater than $R_{upper}$ or less than $R_{lower}$, the first and second virtual objects move relative to each other. In other words, the first virtual object slides relative to the second virtual object.

In the present embodiment, as in the first embodiment, the inverse of the first virtual object's displacement $p_1$ is used as the target position command for the position control and driving device 33A. Accordingly, when the first virtual object slides relative to the second virtual object, it can be perceived in the environment 50 as if the terminal output shaft of the drive unit 10C slides. Moreover, at this time, the actual torque that is applied to mechanical components of the drive portion 21A is limited.

In summary, this function is used to set the upper and lower limit values of the virtual interactive force $\lambda_R$ so as to limit the load on the mechanical components of the drive portion 21A (in particular, fragile components such as the transmission device 34 and the force measuring instrument 35) to a certain value or less and thereby prevent the mechanical components from being broken or damaged. That is, the drive unit 10C according to the present embodiment renders it possible to protect hardware in a software-like manner.

In the case where the driving device 41 is of a translational type, the actual force that is applied to the mechanical components of the drive portion 21A is limited. Accordingly, in such a case, the above function should be referred to as the "virtual force limiter".

Described next is a "sliding deviation restoring function".

Once the virtual torque limiter (virtual force limiter) is activated, the first and second virtual objects move relative to each other. The sliding deviation restoring function renders it possible to converge the relative displacement or velocity between the first and second virtual objects to zero. In other words, this function renders it possible to restore position and/or velocity deviations caused by sliding.

In the present embodiment, this function is realized using the parameter $\lambda_{RPD}$ as given by equation (9). Setting such a parameter allows the first and second virtual objects to be connected by a virtual spring-damper and thereby results in achieving the effects described above. The degree (or intensity) of convergence can be adjusted by the gains $K_{RP}$ and $K_{RD}$.

The drive unit 10C according to the present embodiment can achieve advantages of both high and low backdrivability, as done in the first and second embodiments.

The effects of the present embodiment will be described in more detail using an example where the inertia distribution ratio κ is set to a relatively low value of 0.1 so that the inertias of the first and second virtual objects are 0.1 M and 0.9 M, respectively.

When the virtual torque limiter is not activated, the first and second virtual objects move as one, and therefore it can be perceived in the environment 50 as if the inertia at the terminal output shaft of the drive unit 10C is M (=0.1 M+0.9 M). Therefore, in the case of the drive unit 10C according to the present embodiment, matching the value M to the actual inertia of the drive portion 21A prevents an excess load from being applied to the driving device 41 while achieving more stable position control. That is, it is rendered possible to achieve advantages of low backdrivability.

On the other hand, when the virtual torque limiter is activated, the inertia at the terminal output shaft as viewed from the environment 50 can be lowered to the minimum of 0.1 M. Therefore, the drive unit 10C according to the present embodiment can protect the mechanical components of the drive portion 21A against overload. That is, it is rendered possible to achieve an advantage of high backdrivability.

In the present invention, the total virtual object inertia M and the total virtual object viscous friction D are distributed to the first and second virtual objects at the distribution ratios κ and γ, as described earlier. The distribution ratios κ and γ affect the behavior of the first and second virtual objects where the virtual torque limiter is activated. As the distribution ratios κ and γ decrease, overload protection performance increases. However, it should be noted that if the distribution ratios κ and γ are excessively decreased, position control in the position control and driving device 33A might become unstable when the virtual torque limiter is activated.

<Variants>

While the first through third embodiments of the drive unit according to the present invention have been described above, the present invention is not limited to the configurations of these embodiments.

Figure 8:
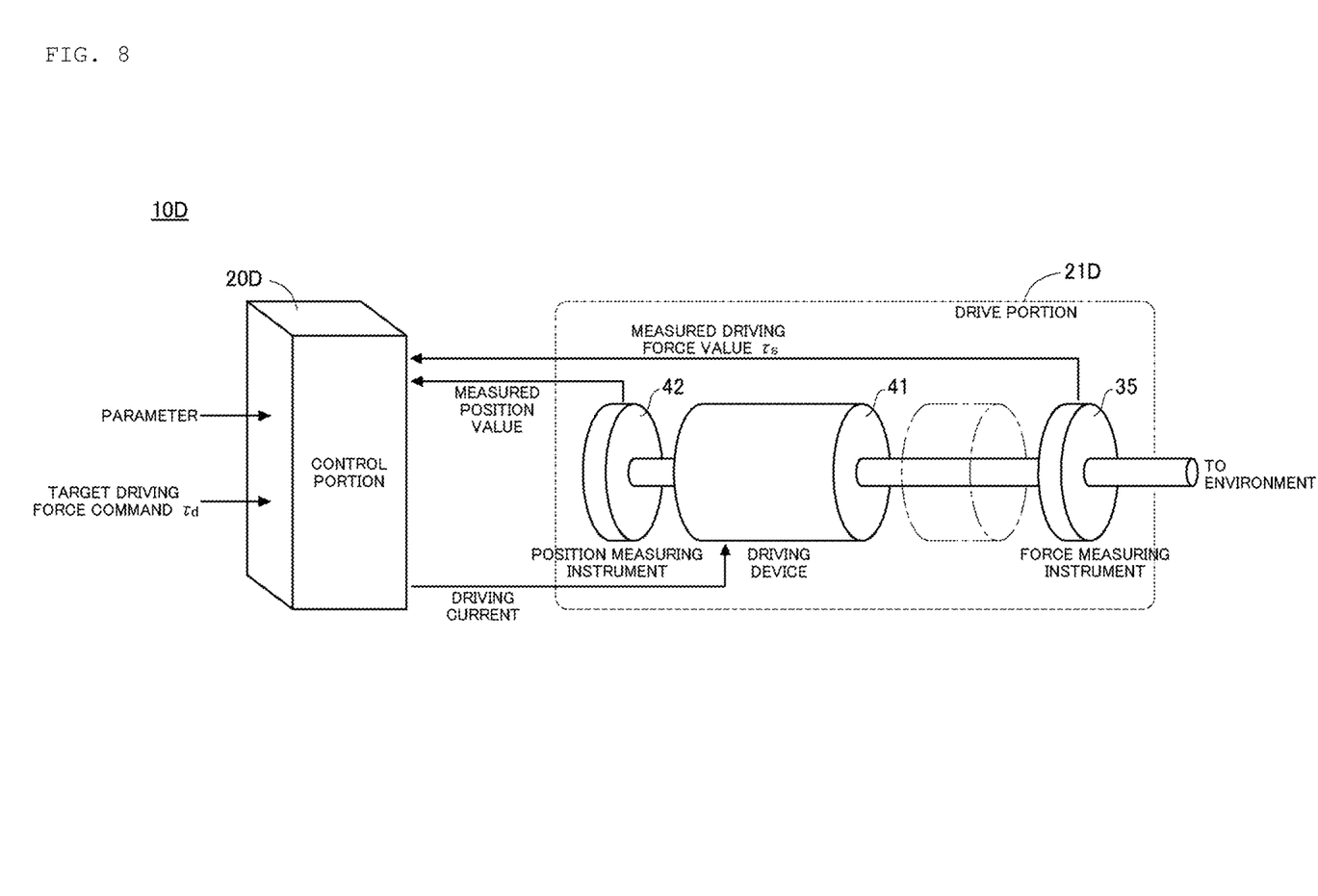
FIG. 8 is a schematic entity-relationship diagram of a drive unit according to a variant of the present invention.
Figure 9:
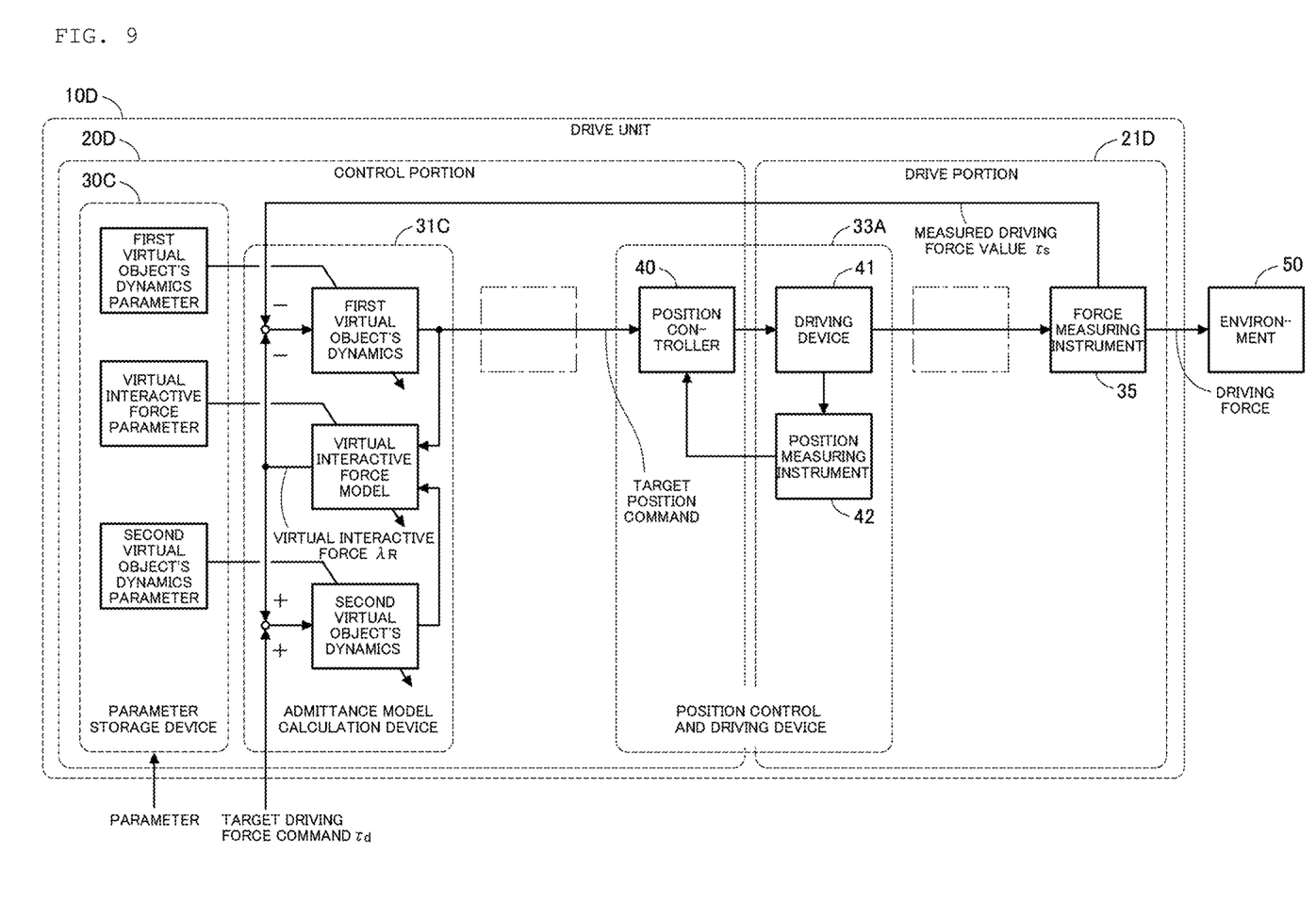
FIG. 9 is a block diagram of the drive unit according to the variant of the present invention.

For example, a drive unit 10D according to a variant of the present invention may include a control portion 20D without an inverse model calculation portion and a drive portion 21D without a transmission device (see FIGS. 8 and 9). The drive unit 10D can be considered equivalent to the drive unit 10C according to the third embodiment without the inverse model calculation device 32A and the transmission device 34. In the case of the drive unit 10D, the first virtual object's displacement $p_1$ calculated by the admittance model calculation device 31C is used as the target position command for the position control and driving device 33A.

It should be understood that the drive unit 10A according to the first embodiment or the drive unit 10B according to the second embodiment can also be provided without the inverse model calculation portion and the transmission device.

Furthermore, the drive unit 10A according to the first embodiment, the drive unit 10B according to the second embodiment, or the drive unit 10D according to the variant may additionally have the virtual torque limiter function and the sliding deviation restoring function.

Furthermore, in the case where the driving device 41 is of a type that does not require feedback of the measured position value (for example, a stepping motor), the position measuring instrument 42 can be omitted from the position control and driving device 33A. Similarly, the velocity measuring instrument 44 can be omitted from the velocity control and driving device 33B.

Furthermore, the first virtual object's dynamics are not limited to those given by equation (1) and may be defined by equations including terms related to coulomb friction (static and dynamic friction), motion range limits, etc. Similarly, the second virtual object's dynamics are not limited to those given by equation (2).

Furthermore, the virtual interactive force models are not limited to those given by equations (3) and (8).

INDUSTRIAL APPLICABILITY

The present invention is advantageous particularly in applications where the force of a drive portion with high power and a high reduction ratio is flexibly controlled in a highly safe and adaptable manner.

DESCRIPTION OF THE REFERENCE CHARACTERS 10A, 10B, 10C, 10D drive unit
20A, 20B, 20C, 20D control portion
21A, 21B, 21D drive portion
30A, 30C parameter storage device
31A, 31C admittance model calculation device
32A, 32B inverse model calculation device
33A position control and driving device
33B velocity control and driving device
34 transmission device
35 force measuring instrument
40 position controller
41 driving device
42 position measuring instrument
43 velocity controller
44 velocity measuring instrument
50 environment

The invention claimed is:

1. A drive unit exerting a driving force on an environment in accordance with an externally provided target driving force command, the drive unit comprising:
   a parameter storage device having stored therein dynamics parameters of first and second virtual objects affected by a virtual interactive force;
   a force measuring instrument configured to output a measurement result for the driving force as a measured driving force value;
   an admittance model calculation device configured to calculate and output a displacement of the first virtual object, the displacement being obtained by calculations based on the first and second virtual objects' dynamics parameters stored in the parameter storage device, the target driving force command, and the measured driving force value; and
   a position control and driving device configured to operate in accordance with a target position command and thereby exert the driving force on the environment, wherein,
   the force measuring instrument is disposed between the position control and driving device and the environment, and
   the target position command corresponds to the first virtual object's displacement outputted by the admittance model calculation device.

2. The drive unit according to claim 1, wherein the position control and driving device is a single-axis device configured to operate in accordance with the target position command.

3. The drive unit according to claim 1, wherein the first and second virtual objects' dynamics parameters stored in the parameter storage device are externally modifiable.

4. The drive unit according to claim 1, wherein,
   the measured driving force value directly acts only on the first virtual object's dynamics in the calculations by the admittance model calculation device, the target driving force command directly acts only on the second virtual object's dynamics in the calculations by the admittance model calculation device, and the first and second virtual objects' dynamics interact with each other solely via the virtual interactive force outputted by a virtual interactive force model.

5. The drive unit according to claim 4, wherein, the parameter storage device further stores interaction parameters for the virtual interactive force model, and the interaction parameters include upper and lower limit values of the virtual interactive force.

6. The drive unit according to claim 4, wherein, the parameter storage device further stores interaction parameters for the virtual interactive force model, the virtual interactive force model has a function that converges a relative displacement or velocity between the first and second virtual objects to zero, and the interaction parameters include a parameter for the convergence.

7. The drive unit according to claim 5, wherein the virtual interactive force model's interaction parameters stored in the parameter storage device are externally modifiable.

8. A drive unit exerting a driving force on an environment in accordance with an externally provided target driving force command, the drive unit comprising:

a parameter storage device having stored therein dynamics parameters of first and second virtual objects affected by a virtual interactive force;

a force measuring instrument configured to output a measurement result for the driving force as a measured driving force value;

an admittance model calculation device configured to calculate and output a velocity of the first virtual object, the velocity being obtained by calculations based on the first and second virtual objects' dynamics parameters stored in the parameter storage device, the target driving force command, and the measured driving force value; and a velocity control and driving device configured to operate in accordance with a target velocity command and thereby exert the driving force on the environment, wherein, the force measuring instrument is disposed between the velocity control and driving device and the environment, and the target velocity command corresponds to the first virtual object's velocity outputted by the admittance model calculation device.

9. The drive unit according to claim 8, wherein the velocity control and driving device is a single-axis device configured to operate in accordance with the target velocity command.

10. The drive unit according to claim 8, wherein the first and second virtual objects' dynamics parameters stored in the parameter storage device are externally modifiable.

11. The drive unit according to claim 8, wherein, the measured driving force value directly acts only on the first virtual object's dynamics in the calculations by the admittance model calculation device, the target driving force command directly acts only on the second virtual object's dynamics in the calculations by the admittance model calculation device, and the first and second virtual objects' dynamics interact with each other solely via the virtual interactive force outputted by a virtual interactive force model.

12. The drive unit according to claim 11, wherein, the parameter storage device further stores interaction parameters for the virtual interactive force model, and the interaction parameters include upper and lower limit values of the virtual interactive force.

13. The drive unit according to claim 11, wherein, the parameter storage device further stores interaction parameters for the virtual interactive force model, the virtual interactive force model has a function that converges a relative displacement or velocity between the first and second virtual objects to zero, and the interaction parameters include a parameter for the convergence.

14. The drive unit according to claim 12, wherein the virtual interactive force model's interaction parameters stored in the parameter storage device are externally modifiable.

* * * * *